US010682771B2

(12) United States Patent
Ogata

(10) Patent No.: US 10,682,771 B2
(45) Date of Patent: Jun. 16, 2020

(54) DRIVING MECHANISM, ROBOT ARM, AND ROBOT SYSTEM

(71) Applicant: CANON KABUSHIKI KAISHA, Tokyo (JP)

(72) Inventor: Masaru Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/033,024

(22) Filed: Jul. 11, 2018

(65) Prior Publication Data

US 2019/0009417 A1 Jan. 10, 2019

Related U.S. Application Data

(63) Continuation of application No. PCT/JP2017/000129, filed on Jan. 5, 2017.

(30) Foreign Application Priority Data

Jan. 13, 2016 (JP) ................. 2016-004685

(51) Int. Cl.
B25J 17/02 (2006.01)
B25J 9/16 (2006.01)
B25J 9/00 (2006.01)
B25J 13/08 (2006.01)
B25J 19/00 (2006.01)

(52) U.S. Cl.
CPC ......... *B25J 17/0258* (2013.01); *B25J 9/0009* (2013.01); *B25J 9/1694* (2013.01); *B25J 13/085* (2013.01); *B25J 19/0029* (2013.01)

(58) Field of Classification Search
CPC .... B25J 17/0258; B25J 9/1694; B25J 9/0009; B25J 19/0029; B25J 13/085
USPC .................................................. 700/245, 258
See application file for complete search history.

(56) References Cited

U.S. PATENT DOCUMENTS

| 5,155,423 A * | 10/1992 | Karlen ...................... B25J 9/04 318/568.1 |
| 10,209,152 B2 * | 2/2019 | Matsuzawa ............... G01L 5/16 |
| 2008/0058776 A1 * | 3/2008 | Jo .......................... A61B 34/70 606/1 |
| 2008/0075561 A1 * | 3/2008 | Takemura ............... F16F 1/025 414/2 |
| 2008/0161971 A1 * | 7/2008 | Buckingham .............. B25J 9/06 700/258 |
| 2009/0024142 A1 * | 1/2009 | Ruiz Morales ......... A61B 34/35 606/130 |

(Continued)

FOREIGN PATENT DOCUMENTS

| JP | 58-211888 A | 12/1983 |
| JP | H04-226881 A | 8/1992 |

(Continued)

*Primary Examiner* — Jaime Figueroa
(74) *Attorney, Agent, or Firm* — Canon USA, Inc., IP Division

(57) ABSTRACT

A driving mechanism includes a first link, a second link that relatively swings or rotates with respect to the first link, a driving portion that is supported by the first link and that applies a driving force for driving the second link, a sensor that is disposed between the driving portion and the second link and that outputs displacements of the driving portion and the second link, and a wiring member that is supported by the first link, the second link, and the driving portion.

18 Claims, 10 Drawing Sheets

(56) References Cited

U.S. PATENT DOCUMENTS

| | | | | |
|---|---|---|---|---|
| 2009/0266194 A1* | 10/2009 | Zhang | | B25J 9/042 74/490.01 |
| 2009/0312870 A1* | 12/2009 | Okuda | | B25J 9/102 700/258 |
| 2010/0207412 A1* | 8/2010 | Okazaki | | B25J 9/104 294/106 |
| 2012/0286629 A1 | 11/2012 | Johnson | | |
| 2012/0296472 A1* | 11/2012 | Nagai | | B25J 9/1612 700/258 |
| 2013/0345877 A1* | 12/2013 | Kose | | B25J 9/1633 700/260 |
| 2014/0067125 A1* | 3/2014 | Niu | | B25J 9/1638 700/258 |
| 2015/0119637 A1* | 4/2015 | Alvarez | | A61B 1/00071 600/102 |
| 2015/0209966 A1* | 7/2015 | Hasegawa | | B25J 9/102 74/490.03 |
| 2016/0008983 A1* | 1/2016 | Osaka | | B25J 9/1692 700/254 |
| 2016/0263749 A1* | 9/2016 | Ogata | | B25J 13/085 |
| 2016/0311111 A1* | 10/2016 | Ogawara | | B25J 9/1633 |

FOREIGN PATENT DOCUMENTS

| | | |
|---|---|---|
| JP | 10-058373 A | 3/1998 |
| JP | 2004-090135 A | 3/2004 |
| JP | 2006-000955 A | 1/2006 |
| JP | 2007-229874 A | 9/2007 |
| JP | 2013-094939 A | 5/2013 |
| JP | 2015-085454 A | 5/2015 |
| JP | 2015-123570 A | 7/2015 |
| JP | 2015-209931 A | 11/2015 |

* cited by examiner

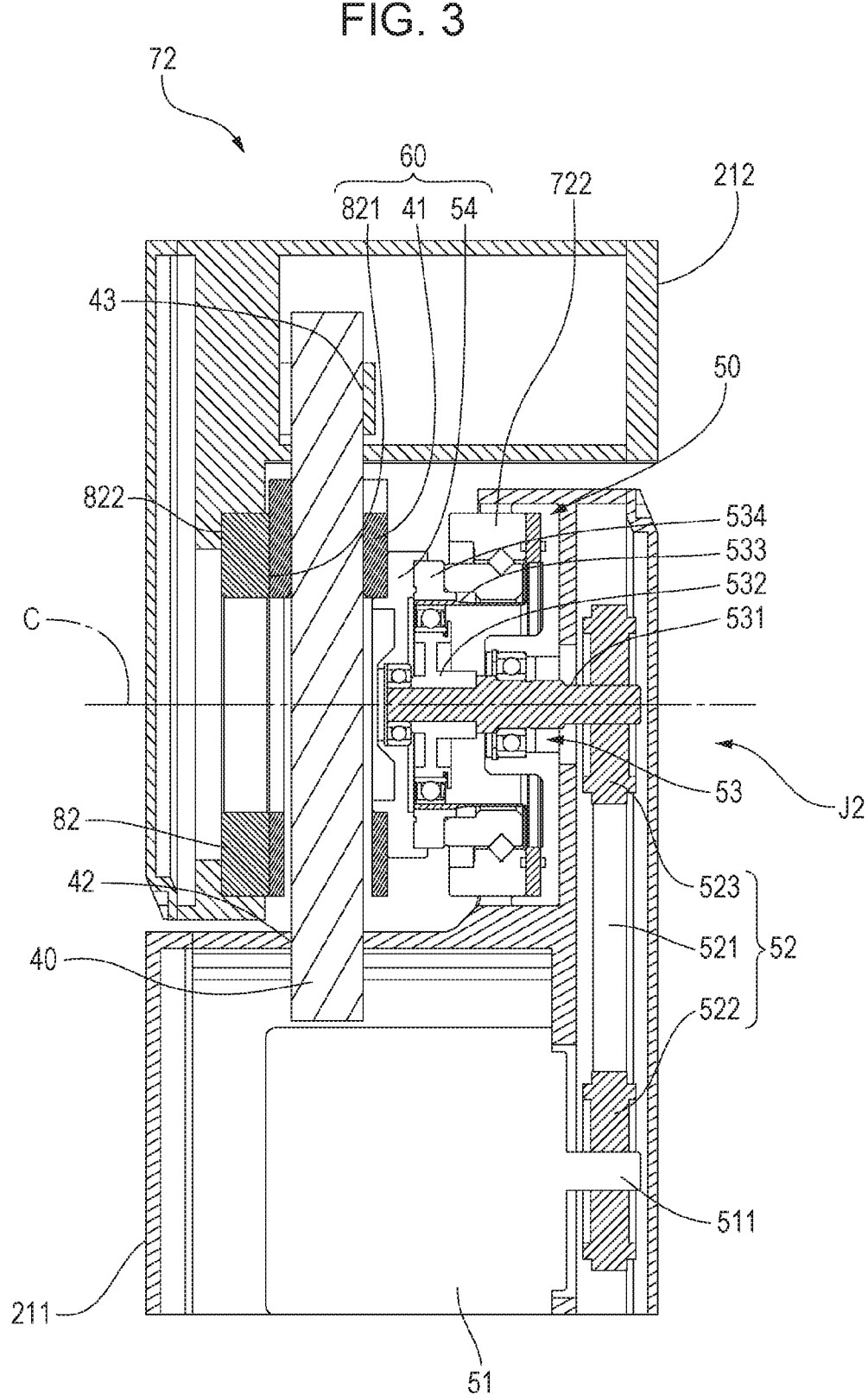

FIG. 6A
FIG. 6B
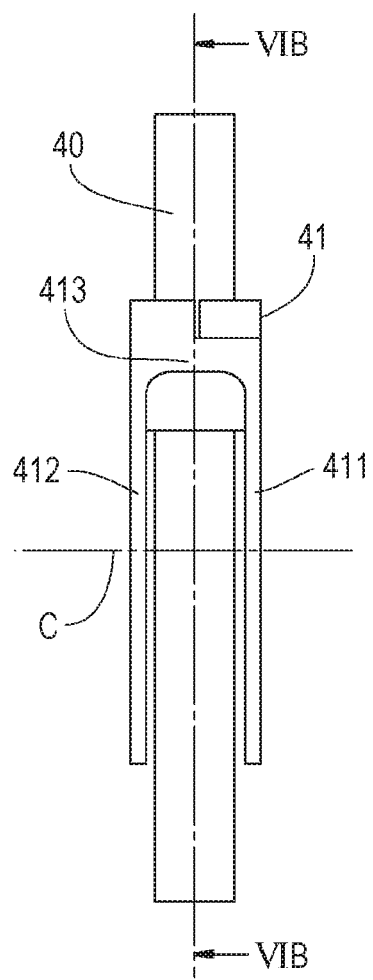
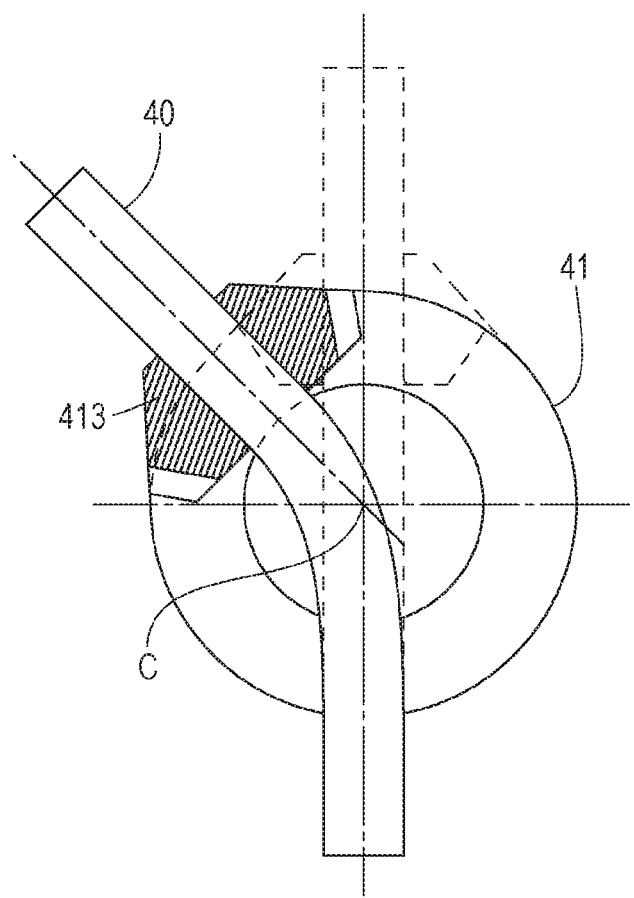

US 10,682,771 B2

DRIVING MECHANISM, ROBOT ARM, AND ROBOT SYSTEM

CROSS-REFERENCE TO RELATED APPLICATIONS

This application is a Continuation of International Patent Application No. PCT/JP2017/000129, filed Jan. 5, 2017, which claims the benefit of Japanese Patent Application No. 2016-004685, filed Jan. 13, 2016, both of which are hereby incorporated by reference herein in their entirety.

TECHNICAL FIELD

The present invention relates to a driving mechanism that causes a second link to relatively swing or rotate with respect to a first link, a robot arm that includes the driving mechanism, and a robot system that includes a control unit for controlling the robot arm.

BACKGROUND ART

In recent years, the usage of articulated robots (manipulators) is increasing, and the articulated robots have a wider range of applications to fields in which robots need to flexibly operate, such as work in corporation with humans or assembly work in factories.

Such a robot needs stable and wide force control (compliance control) to follow an external force. For the force control, a system that is based on torque control (torque servo) of joints is preferably formed instead of a system that has been widely used and that is based on position control (position servo) of joints. Accordingly, there is a need for a driving mechanism that accurately detects torque that acts on each joint with a sensor (torque sensor) for detecting the torque.

The structure of a typical robot includes links that are connected to each other with joints so that the robot can make various movements. Wiring members, such as electrical wires through which power or electrical signals are transmitted to actuators or sensors that are disposed on the respective joints, and an electrical wire or a pipe for driving an end effector that is mounted on a distal end portion of the robot arm, need to be disposed between a proximal end portion of the robot arm and the distal end portion. The wiring members are disposed across the joints that move a great distance. For example, PTL 1 discloses a robot arm that includes a cable holder for fixing a wiring member that extends substantially linearly over the entire cable holder.

CITATION LIST

Patent Literature

PTL 1: Japanese Patent Laid-Open No. 58-211888

However, the reaction force of the wiring member that is deformed by the operation of the robot arm is resistance against each joint that is driven. With a conventional structure, the reaction force due to the deformation of the wiring member directly acts on each link of the robot arm. A torque sensor is disposed to detect torque between each link and a driving portion. When torque (moment) due to the reaction force of the wiring member acts on each link, the torque that acts on the link due to an external force cannot be detected with high sensitivity and high precision.

Since the detection sensitivity of the torque decreases as above, the torque cannot be controlled in the robot arm with high sensitivity, and there is a problem in that the responsiveness of the torque control decreases. Since the accuracy of the detection of the torque decreases, the torque cannot be accurately controlled in the robot arm, and there is a problem in that the accuracy of the force control at the distal end portion of the robot arm decreases.

In view of this, an object of the present invention is to reduce the effect of the reaction force applied by the wiring member to detect torque due to an external force that acts on each link with high sensitivity and high precision.

SUMMARY OF INVENTION

A driving mechanism according to the present invention includes a first link, a second link that relatively swings or rotates with respect to the first link, a driving portion that is supported by the first link and that applies a driving force for driving the second link, a sensor that is disposed between the driving portion and the second link and that outputs displacements of the driving portion and the second link, and a wiring member that is supported by the first link, the second link, and the driving portion.

Further features of the present invention will become apparent from the following description of exemplary embodiments with reference to the attached drawings.

BRIEF DESCRIPTION OF DRAWINGS

FIG. 3 is a sectional view of the driving mechanism according to the first embodiment.

FIG. 6A is a front view of the support member of the driving mechanism according to the first embodiment, and FIG. 6B is a sectional view of the support member taken along line VIB-VIB in FIG. 6A.

DESCRIPTION OF EMBODIMENTS

Embodiments for carrying out the present invention will hereinafter be described in detail with reference to the drawings.

First Embodiment

Figure 1:
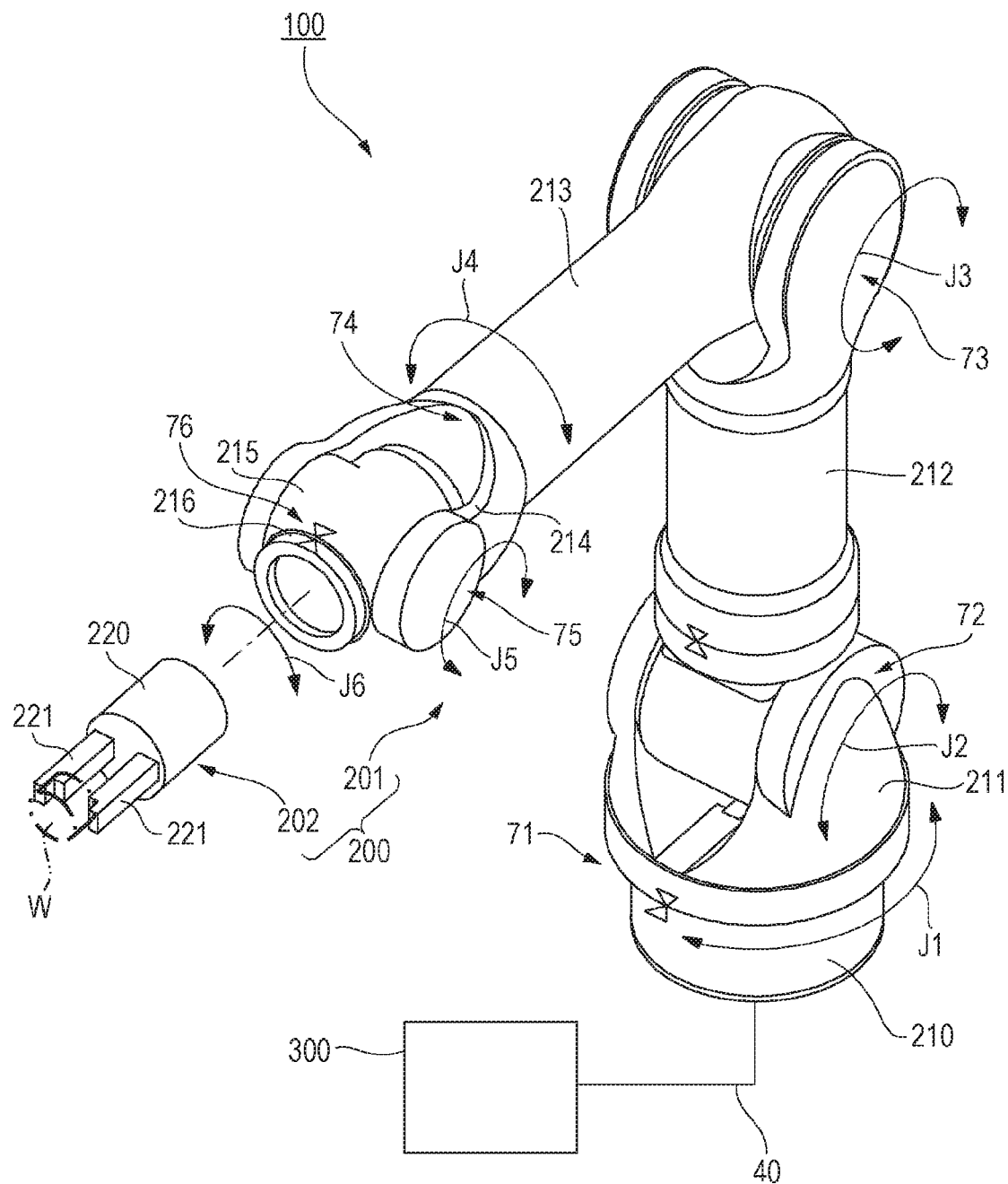
FIG. 1 is a perspective view of a robot system according to a first embodiment.

FIG. 1 is a perspective view of a robot system according to a first embodiment. As illustrated in FIG. 1, a robot system 100 includes a robot 200, and a control device 300 serving as a control unit that controls the robot 200. The robot 200 includes a vertical articulated robot arm 201 including joints J1 to J6 (for example, six joints) and a robot hand 202 corresponding to an end effector.

The robot arm 201 includes links 210 to 216. The links 210 to 216 are connected to each other with the joints J1 to J6 so as to be swingable (referred also to as turnable or bendable) or rotatable. According to the present embodiment, the robot arm 201 includes the six joints J1 to J6: three joints J2, J3, and J5 that are swingable, and three joints J1, J4, and J6 that are rotatable. The joints J1 to J6 include respective driving mechanisms 71 to 76. The proximal-end link (base) 210 corresponding to a proximal end portion of the robot arm 201 is fixed to a stand.

The robot hand 202 is mounted on and supported by the distal-end link 216 corresponding to a distal end portion of the robot arm 201. Movement (position or posture) or force of the robot hand 202 is adjusted by the operation of the robot arm 201. The robot hand 202 includes a hand body 220 and fingers 221 that are movable with respect to the hand body 220 and that can hold a workpiece W.

The control device 300 and the robot 200 are connected to each other by a wiring member 40 such as a cable into which electrical wires, for example, signal lines or electric power lines are tied. In the case of a pneumatic or hydraulic robot, an example of the wiring member 40 includes a pipe. The wiring member 40 is flexible and extends from the proximal end portion (stationary end) of the robot arm 201 to the distal end portion (free end) thereof. The electrical wires forming the wiring member 40 are connected to motors and sensors of the joints J1 to J6 and a motor and a sensor of the robot hand 202.

Figure 2:
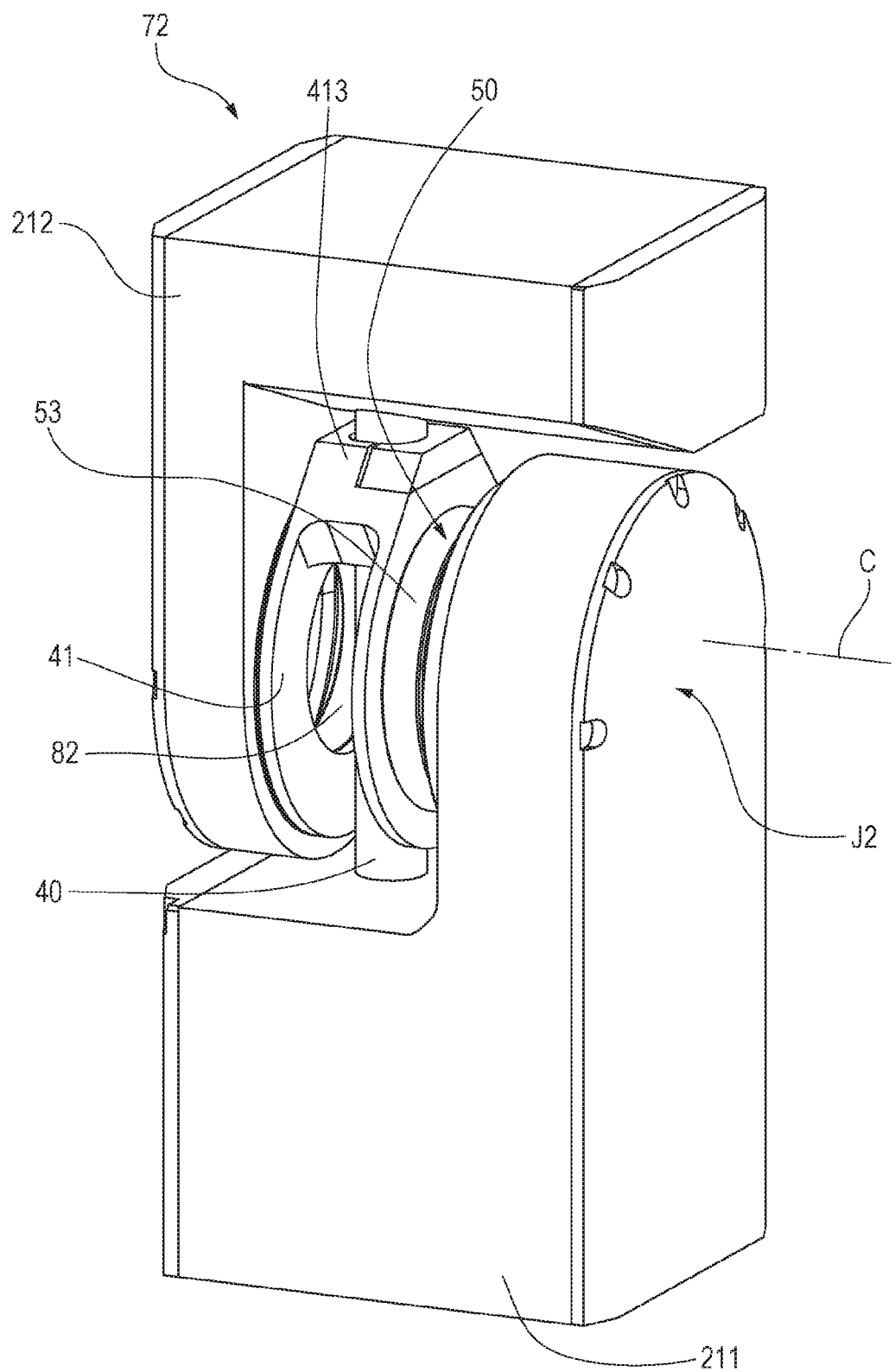
FIG. 2 is a perspective view of a driving mechanism according to the first embodiment.

FIG. 2 is a perspective view of the driving mechanism 72 according to the first embodiment. FIG. 3 is a sectional view of the driving mechanism 72 according to the first embodiment. The driving mechanism 72 of the joint J2 includes the link 211 corresponding to a first link on the proximal end portion side of the robot arm 201 and the link 212 corresponding to a second link that relatively swings with respect to the link 211 and that is on the distal end portion side of the robot arm 201.

According to the present embodiment, the link 211 is a stationary link (referred to also as a base-side link), and the link 212 is an output link (referred to also as a movable link or a periphery-side link) that is movable with respect to the stationary link. The driving mechanism 72 also includes a driving portion 50, the wiring member 40, a support member 41 that supports the wiring member 40, and a torque sensor 82.

The driving portion 50 is supported by the link 211 and applies a driving force that causes the link 212 to swing about a central axis (rotational axis) C with respect to the link 211. That is, the driving portion 50 applies torque between the link 211 and the link 212.

The wiring member 40 extends in the direction perpendicular to the central axis C across the link 211 and the link 212. The torque sensor 82 detects torque in accordance with a displacement between a primary side and a secondary side and detects torque that acts on the link 212 according to the present embodiment.

The link 211 and the link 212 are rotatably connected to each other by a bearing 722 corresponding to a joint support mechanism. The bearing 722 restricts relative movement of the link 212 with respect to the link 211 such that the link 212 can only rotate about the central axis C of the corresponding joint. According to the present embodiment, the bearing 722 is a cross roller bearing, which is widely used for joints.

The driving portion 50 includes an electric motor 51 corresponding to a rotary drive source and a speed reducer 53 that reduces the rotational speed of the electric motor 51 and applies a rotational force. According to the present embodiment, the driving portion 50 includes a transmission mechanism 52 that transmits the rotational force of the electric motor 51 to an input shaft of the speed reducer 53.

The electric motor 51 includes a rotary encoder, not illustrated, for measuring the rotational angle of the motor and a brake, not illustrated, for maintaining the rotational angle of the motor. The electric motor 51 is connected to wiring lines for electric drive of the motor, transmission and reception of signals to and from the rotary encoder, and control of open and close operations of the brake. The wiring lines are contained in the wiring member 40.

A part of the wiring member 40 in the longitudinal direction is fixed to the link 211 by a fixing member 42 and another part that differs from the part fixed by the fixing member 42 in the longitudinal direction is fixed to the link 212 by a fixing member 43. The wiring member 40 extends inside the links 211 and 212. According to the present embodiment, a part of the wiring member 40 that is interposed between the part fixed by the fixing member 42 and the part fixed by the fixing member 43 are supported by the support member 41. A part of the wiring member 40 that is nearer than the part fixed to the link 212 by the fixing member 43 to the distal end is connected to the motors and the sensors that are disposed inside the links that are nearer than the joint J2 to the distal end.

According to the present embodiment, the speed reducer 53 is a strain wave gearing speed reducer. The speed reducer 53 includes an input shaft 531, a wave generator 532 that is fixed to the input shaft 531, a flexspline 533, and a circular spline 534. The circular spline 534 is fixed to the inner wheel of the bearing 722. The outer wheel of the bearing 722 is fixed to the link 211. A rotation member 54 is fixed to the circular spline 534. A driving force of the speed reducer 53 is applied to the rotation member 54. Thus, the rotation member 54 rotates about the central axis C.

The transmission mechanism 52 includes a pulley 522 that is fixed to a rotation shaft 511 of the electric motor 51, a pulley 523 that is fixed to the input shaft 531 of the speed reducer 53, and a loop timing belt 521 that is wound around the pulleys 522 and 523.

A driving force applied by the electric motor 51 is transmitted through the pulley 522, the timing belt 521, and the pulley 523 and causes the input shaft 531 of the speed reducer 53 to rotate. The speed reducer 53 increases torque applied by the electric motor 51 by an amount corresponding to a reduction ratio (decreases a rotational angle by an amount corresponding to the reduction ratio at the same time), and the increased torque is applied from the rotation member 54. Thus, the torque applied by the electric motor 51 is increased by the speed reducer 53 to a level suitable for driving the corresponding joint. The torque applied by the speed reducer 53 causes the link 212 that is supported by the bearing 722 to actively swing.

According to the present embodiment, the joints J1 to J6 (FIG. 1) include the respective torque sensors 82. The control device 300 compliance-controls the robot arm 201 on the basis of detection results of the torque sensors 82.

The value of torque that the electric motor 51 can efficiently apply is much smaller than torque required to drive each joint. The rated rotational speed is much larger than a rotational speed for which the output shaft of each joint is required. For this reason, according to the present embodiment, the speed reducer 53 is a speed reducer (for example, a strain wave gearing speed reducer) having a high reduction ratio of about 1:30 to 1:200, for example, 1:100. The main reason is to make the mechanism compact. Consequently, a speed reducer having a high reduction ratio is needed, and a torque loss increases due to rotation resistance and friction inside the driving portion 50 caused by a reduction in the speed.

Accordingly, the torque of the output stage of each joint cannot be accurately grasped only by the measurement of motor torque (or measurement of a motor electric current in proportion to the motor torque). In addition, the torque loss is mainly caused by non-linear physical phenomena such as friction. Accordingly, precise modeling is difficult, and it is also difficult to correct output torque because of a lack of reproducibility. For this reason, each torque sensor needs to accurately measure the torque of the driving portion on the output side. In view of this, according to the present embodiment, one of the torque sensors 82 is disposed between the output side (the rotation member 54) of the driving portion 50 and the link 212. The reduction ratio of the speed reducer 53 is not limited to the values described above.

Figure 10:
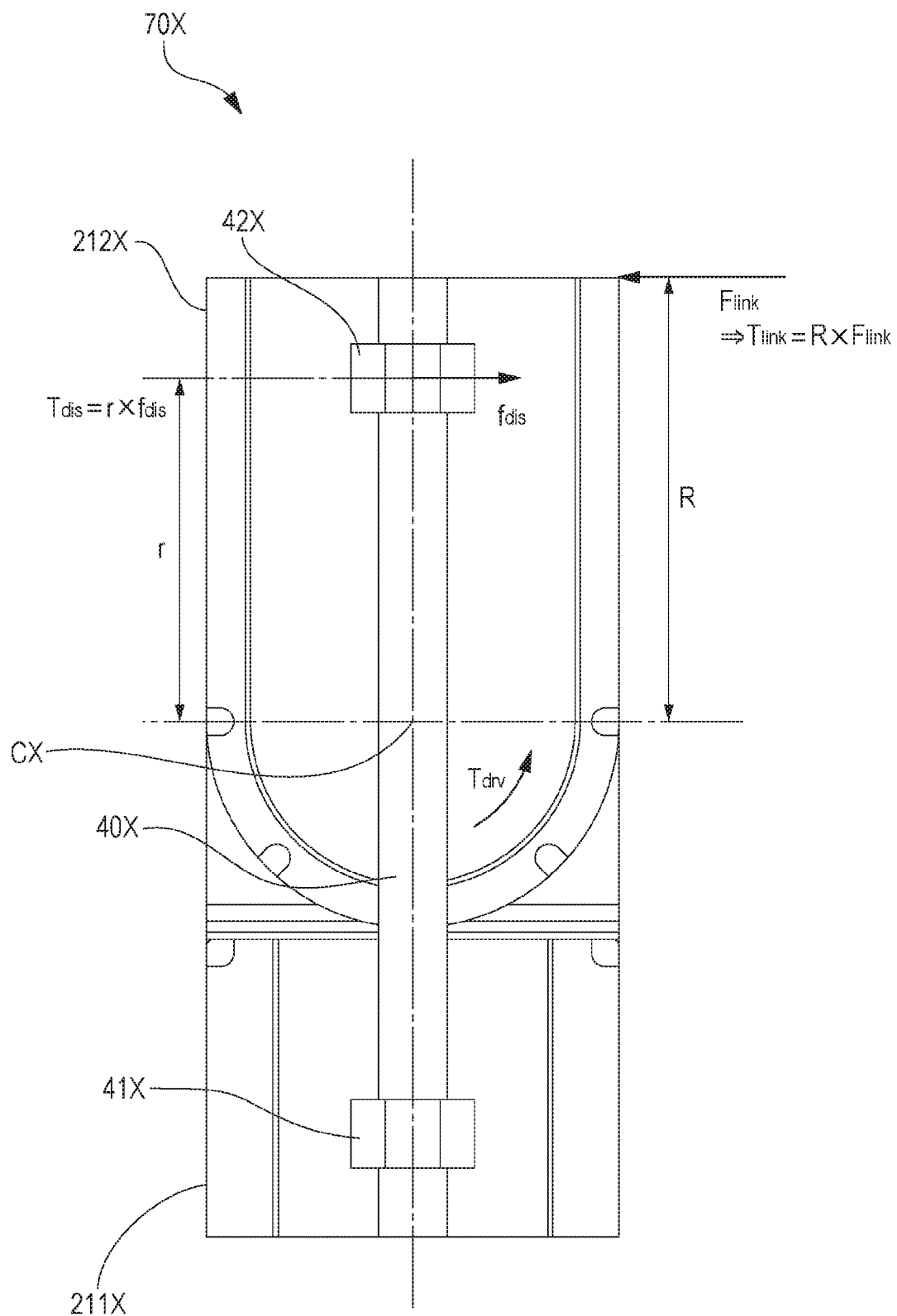
FIG. 10 is a side view of a driving mechanism in a comparative example.
Figure 11:
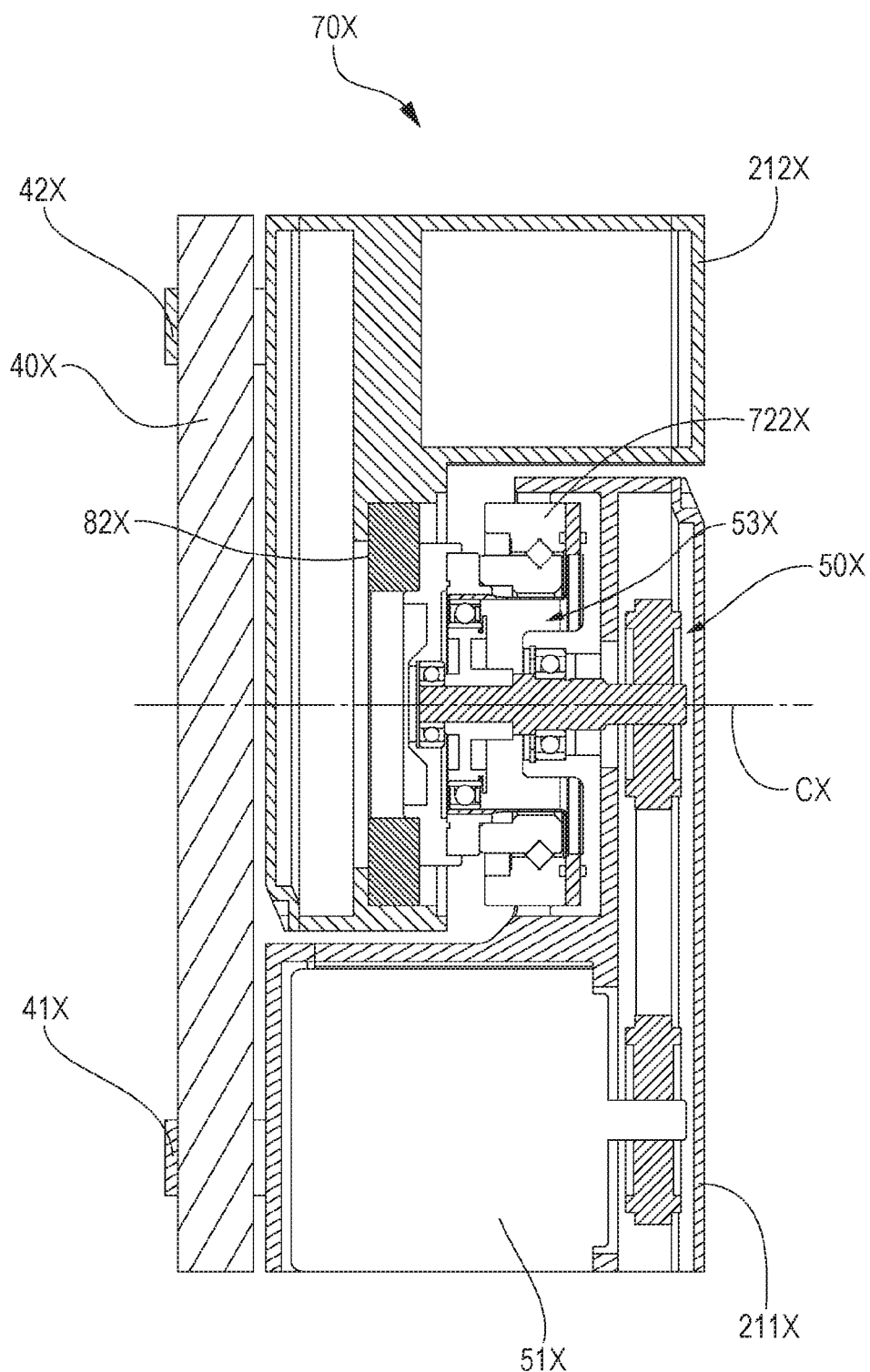
FIG. 11 is a sectional view of the driving mechanism in the comparative example.

A driving mechanism in a comparative example will now be described in detail with reference to the drawings. FIG. 10 is a side view of a driving mechanism 70X in a comparative example. FIG. 11 is a sectional view of the driving mechanism 70X in the comparative example. FIG. 11 illustrates a section of the driving mechanism 70X illustrated in FIG. 10 taken along the central line. The driving mechanism 70X includes a link 211X, a link 212X, a wiring member 40X, a bearing 722X, a driving portion 50X, and a torque sensor 82X. The driving portion 50X is supported by the link 211X. The driving portion 50X is connected on the output side to the link 212X with the torque sensor 82X interposed therebetween. Thus, the driving portion 50X causes the link 212X to swing with the torque sensor 82X interposed therebetween.

The wiring member 40X is fixed to outer side walls of the links 211X and 212X by fixing members 41X and 42X. The wiring member 40X is guided into the inside of the robot arm and connected to the sensor and the motor for driving the joint located ahead, the joint located further ahead, or the end effector.

The link 211X is a stationary link on the proximal end portion side of the robot arm. The link 212X is an output link that is driven by the driving portion on the distal end portion side of the robot arm. The link 211X and the link 212X are rotatably connected to each other by the bearing 722X. Specifically, the driving portion 50X includes a motor 51X and a speed reducer 53X and is supported by the link 211X, and the link 212X is connected to the driving portion 50X on the output side with the torque sensor 82X interposed therebetween. The torque sensor 82X measures output torque $T_{drv}$ applied by the driving portion 50X in a manner in which relative displacements of the inner wheel and the outer wheel are measured.

What is considered here is static equilibrium (force balance) when an end of the link 212X comes into contact with an external environment. That is, what is considered is control of joint torque to control an external force $F_{link}$ in FIG. 10.

As illustrated in FIG. 10, $T_{link}$ is moment (torque) applied about the central axis CX of the corresponding joint due to the external force $F_{link}$. The torque $T_{link}$ is expressed as the following expression (1). In the expression, R is the distance from the central axis CX of the joint to the point of action of the external force $F_{link}$.

$$T_{link}=R \times F_{link} \quad (1)$$

The wiring member 40X that is fixed to the link 212X applies a reaction force $f_{dis}$ to the link 212X when deforming as illustrated in FIG. 10. As illustrated in FIG. 10, $T_{dis}$ is moment (torque) applied about the central axis CX of the joint due to the reaction force $f_{dis}$. The torque $T_{dis}$ is expressed as the following expression (2). In the expression, r is the distance between the central axis CX of the joint and the fixing member 42X (the distance to the point of action of the reaction force of the wiring member).

$$T_{dis}=r \times f_{dis} \quad (2)$$

The torque sensor 82X is disposed between the driving portion 50X and the link 212X, and the torque $T_{JTS}$ that the torque sensor 82X measures is equal to the output torque $T_{drv}$ of the driving portion 50X.

$$T_{JTS}=T_{drv} \quad (3)$$

In light of the above, the equilibrium of the torque applied about the central axis CX of the link 212X of the driving mechanism 70X is expressed as the following expression (4).

$$(T_{JTS}=)T_{drv}=T_{link}+T_{dis}. \quad (4)$$

The torque $T_{JTS}$ that the torque sensor 82X of the driving mechanism 70X in the comparative example measures is not equal to the torque $T_{link}$ for driving the link 212X. That is, the torque $T_{JTS}$ that the torque sensor 82X measures is obtained by superimposing the reaction torque $T_{dis}$ due to the deformation of the wiring member 40X on the torque $T_{link}$ due to the external force.

The two links 211X and 212X of the driving mechanism 70X in the comparative example are connected to each other, and a power transmission passage that is formed of the driving portion 50X and the torque sensor 82X, and the wiring member 40X extending to the motor 51X, the sensor, and so on are interposed therebetween. Accordingly, in the driving mechanism 70X in the comparative example, a force is transmitted between the links via two passages, and the reaction force moment $T_{dis}$ that is attributable to deformation resistance of the wiring member 40X extending across the joint affects the joint torque measurement just like a dead zone.

According to the present embodiment, the driving portion 50 is connected on the output side (the rotation member 54) to the torque sensor 82 with the support member 41 interposed therebetween. That is, the support member 41 is connected (fixed) to the rotation member 54 that rotates in response to the driving force of the driving portion 50.

Figure 4A:
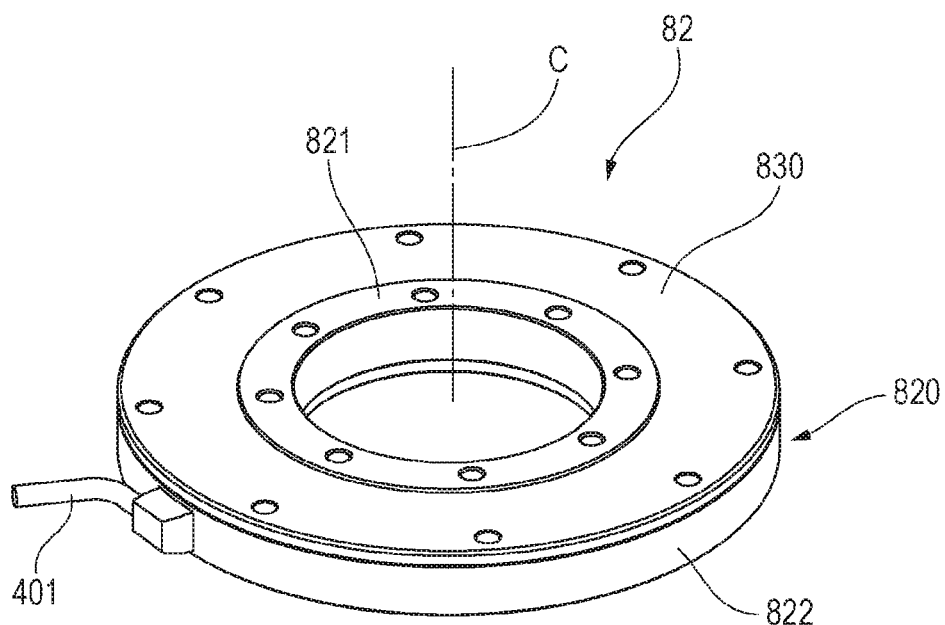
FIG. 4A is a perspective view of a torque sensor.
Figure 4B:
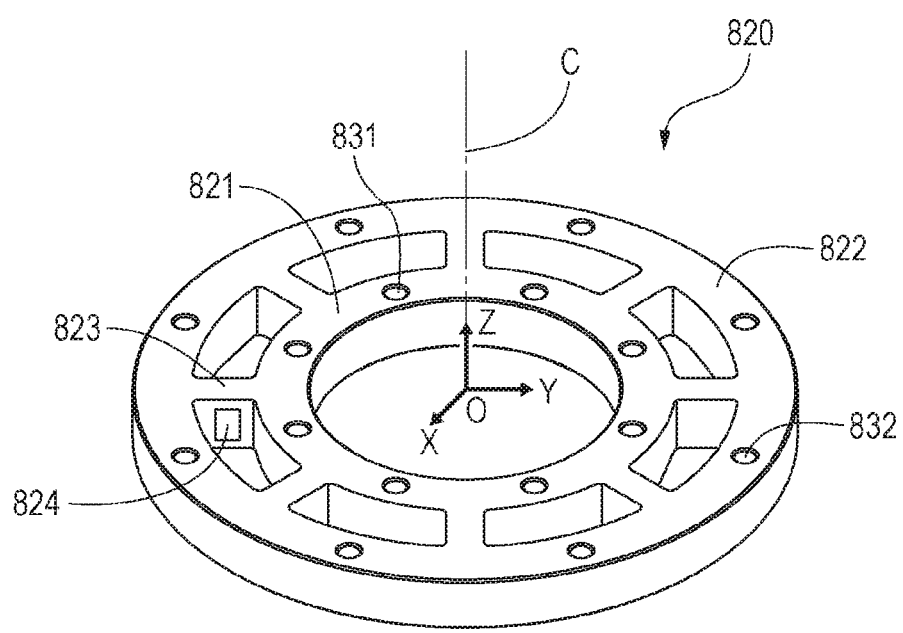
FIG. 4B is a perspective view of the sensor body of the torque sensor.

FIG. 4A is a perspective view of one of the torque sensors. FIG. 4B is a perspective view of the sensor body of the torque sensor. Each torque sensor 82 includes a sensor body 820 and an exterior member (cover) 830 that covers the sensor body 820.

The sensor body 820 includes an inner wheel member 821 corresponding to a primary connection member (a member near the driving portion), an outer wheel member 822 corresponding to a secondary connection member (link-side member), elastic deformation members 823 that elastically deform, and a detection portion 824 that is mounted on one of the elastic deformation members 823. The inner wheel member 821, the outer wheel member 822, the elastic deformation members 823, and the detection portion 824 form the sensor body 820 (the torque sensor 82) as a unit.

The inner wheel member 821, the outer wheel member 822, and the elastic deformation members 823 are integrally formed, for example, by cutting a cylindrical material. The detection results (signals) of the torque are outputted to the control device 300 via a cable 401. The cable 401 is a part of the wiring member 40.

The inner wheel member 821 and the outer wheel member 822 each have a ring shape (annular shape). The inner wheel member 821 is located inside the outer wheel member 822. The inner wheel member 821 and the outer wheel member 822 are coaxial with each other with respect to the central axis C. The elastic deformation members 823 are radially arranged at an interval in the circumferential direction about the central axis C of the inner wheel member 821 and the outer wheel member 822. A radial end of each elastic deformation member 823 is directly connected to the inner wheel member 821. The other radial end of the elastic deformation member 823 is directly connected to the outer wheel member 822. Thus, both ends of the elastic deformation member 823 are supported by the inner wheel member 821 and the outer wheel member 822.

The elastic deformation members 823 elastically deform to the degree corresponding to torque between the inner wheel member 821 and the outer wheel member 822. That is, the elastic deformation members 823 elastically deform in response to rotational moment (torque) applied from the link 212. Each elastic deformation member 823, which is formed of the same material as the inner wheel member 821 and the outer wheel member 822, is thin so as to elastically deform. Thus, the elastic deformation of the elastic deformation members 823 causes the outer wheel member 822 to rotate about the central axis C (about the Z-axis in FIG. 4B) and to be displaced relatively with respect to the inner wheel member 821.

The inner wheel member 821 and the outer wheel member 822 each have bolt holes 831 and 832. The inner wheel member 821 is fixed (connected) to the support member 41 with bolts, not illustrated. The outer wheel member 822 is fixed to the link 212 with bolts, not illustrated. Accordingly, the inner wheel member 821 rotates together with the support member 41 (the rotation member 54), and the outer wheel member 822 rotates together with the link 212. That is, the rotation member 54, the support member 41, and the inner wheel member 821 form an output member 60 that applies the driving force of the driving portion 50. Accordingly, an end of each elastic deformation member 823 is directly supported by the output member 60 (indirectly supported by the driving portion 50 on the output side), and the other end of the elastic deformation member 823 is directly supported by the outer wheel member 822 (indirectly supported by the link 212). Since the output member 60 is divided into the three members 54, 41, and 821, the driving mechanism 72 is easy to manufacture.

The detection portion 824 detects physical quantity corresponding to the torque due to the external force that acts on the link 212, which corresponds to the output link that swings with respect to the link 211, which corresponds to the stationary link. Specifically, the detection portion 824 is a strain gauge that detects physical quantity corresponding to the torque in accordance with a displacement of the outer wheel member 822 (the link 212) with respect to the inner wheel member 821 due to the elastic deformation of the elastic deformation member 823, that is, the degree of the deformation (strain) of the elastic deformation member 823.

The detection result of the detection portion 824 corresponds to the rotational moment (torque) about the central axis C that acts between the inner wheel member 821 and the outer wheel member 822. Accordingly, the control device 300 receives the detection result of the detection portion 824 of each torque sensor 82 as a torque value.

The wiring member 40 is supported by the output member 60, specifically, the support member 41 between the torque sensor 82 and the driving portion 50. Accordingly, the reaction force applied by the wiring member 40 that bends when the joint J2 swings is applied to the driving portion 50 (the speed reducer 53) on the output side, does not directly act on the link 212, and is unlikely to be applied to the link 212.

Thus, the physical quantity corresponding to the torque that is detected by the detection portion 824 is inhibited from being affected by the reaction force of the wiring member 40. Accordingly, the torque (physical quantity corresponding thereto) due to the external force that acts on the link 212 can be detected with high sensitivity and high precision. Consequently, the accuracy of the compliance control of the robot arm 201 is improved.

There is no relative movement of a part of the wiring member 40 between the support member 41 and the fixing member 43 (except for elastic deformation of the torque sensor 82 and a link structure). Accordingly, the part of the wiring member 40 between the support member 41 and the fixing member 43 scarcely deforms even when the joint J2 swings. For this reason, a force that is applied to the link 212 by the wiring member 40 is supported at the fixing member 43 and scarcely changes. Accordingly, the torque sensor 82 (the detection portion 824) is not affected by the reaction force (torque disturbance) due to the deformation of the wiring member 40, and the torque due to the external force that acts on the link 212 alone can be detected with high sensitivity and high precision.

The torque that is detected by the torque sensor 82 (the detection portion 824) will now be described in detail. As in the expressions (1) to (4), $T_{drv}$ is torque that the driving portion 50 applies. $T_{link}$ is moment (torque) about the central axis C of the joint J2 due to the external force that acts on the link 212. $T_{dis}$ is moment (torque) about the central axis C of the joint J2 due to the reaction force of the wiring member 40. $T_{JTS}$ is torque that is detected by the torque sensor 82 (the detection portion 824).

Since the reaction force of the wiring member 40 is supported by the output member 60, and does not directly act on the link 212 as described above, it can be considered that the output member 60 alone is mechanically connected to the link 212 with the torque sensor 82 interposed therebetween. Accordingly, the equilibrium of torque that acts on the torque sensor 82 is given as:

$$T_{JTS} = T_{link}. \quad (5)$$

Torque that acts on the output member 60 includes three kinds of torque: the output torque $T_{drv}$ of the driving portion 50, the torque $T_{dis}$ due to the reaction force of the wiring member 40, and the support torque (the reaction torque of the torque that is detected by the torque sensor) of the torque sensor. Similarly, the equilibrium of torque relative to the output member 60 gives the following expression:

$$T_{JTS} = T_{dis} + T_{drv}. \quad (6)$$

This indicates that the torque that is detected by the torque sensor includes the torque that the driving portion applies and the reaction torque of the wiring member.

The torque can thus be detected with high precision and high sensitivity without a dead zone. Accordingly, the sensitivity and the accuracy of the torque control of each joint of the robot arm 201 can be improved, and the torque control of the joint with high responsiveness can be achieved.

Consequently, the accuracy of the force control (compliance control) at the distal end portion of the robot arm 201 is improved.

In addition, there is no need for correction control, such as assumption of the reaction force of the wiring member on the basis of the degree of the deformation of the wiring member and a preliminary experiment to acquire correction data. The mechanism and control are not complicated. The sensitivity, the accuracy, and the responsiveness of the torque control of each joint can be improved.

Figure 5:
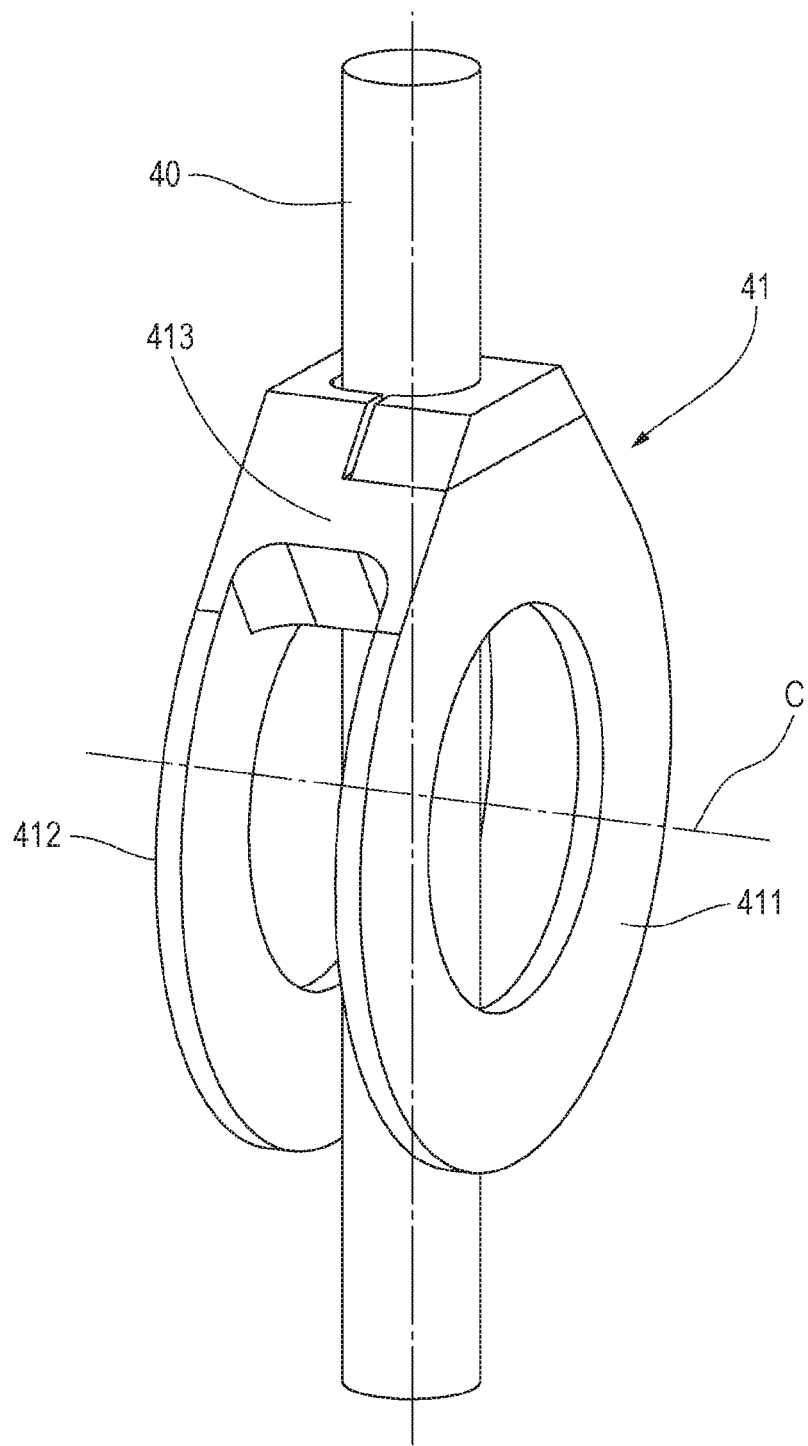
FIG. 5 is a perspective view of a support member of the driving mechanism according to the first embodiment.

FIG. 5 is a perspective view of the support member of the driving mechanism according to the first embodiment. The support member 41 includes a mounting portion 411 corresponding to a first mounting portion that is mounted on the rotation member 54 and a mounting portion 412 corresponding to a second mounting portion that is mounted on the inner wheel member 821 of the torque sensor 82. The support member 41 also includes a fixing portion 413 that mechanically clamps the wiring member 40 to fix the wiring member 40.

The mounting portions 411 and 412 each have a flat plate shape and function as guides for pulling the wiring member 40. The fixing portion 413 is disposed (formed) between the mounting portion 411 and the mounting portion 412. The fixing portion 413 is formed at a position that is offset toward the link 212 in the direction perpendicular to the central axis C from the axial center (central axis C) of the rotation member 54.

FIG. 6A is a front view of the support member of the driving mechanism according to the first embodiment, and FIG. 6B is a sectional view of the support member taken along line VIB-VIB in FIG. 6A. FIG. 6B illustrates the support member 41 that swings together with the link 212 when the link 212 swings, and the wiring member 40 that is supported by the support member 41. As illustrated in FIG. 6A, the support member 41 fixes (supports) the wiring member 40 at a position away from the central axis C of the joint J2 along which the wiring member 40 is pulled. Thus, even when the joint J2 swings, movement of the wiring member 40 is not impeded due to interference with other components, and the wiring member 40 can bend without causing excessive stress.

The driving mechanism 72 of the joint J2 is described above. The other driving mechanisms 73 and 75 of the joints J3 and J5 that swing can have the same structure as the driving mechanism 72. Accordingly, the accuracy of the force control (compliance control) of the robot arm 201 is further improved.

Second Embodiment

Figure 7:
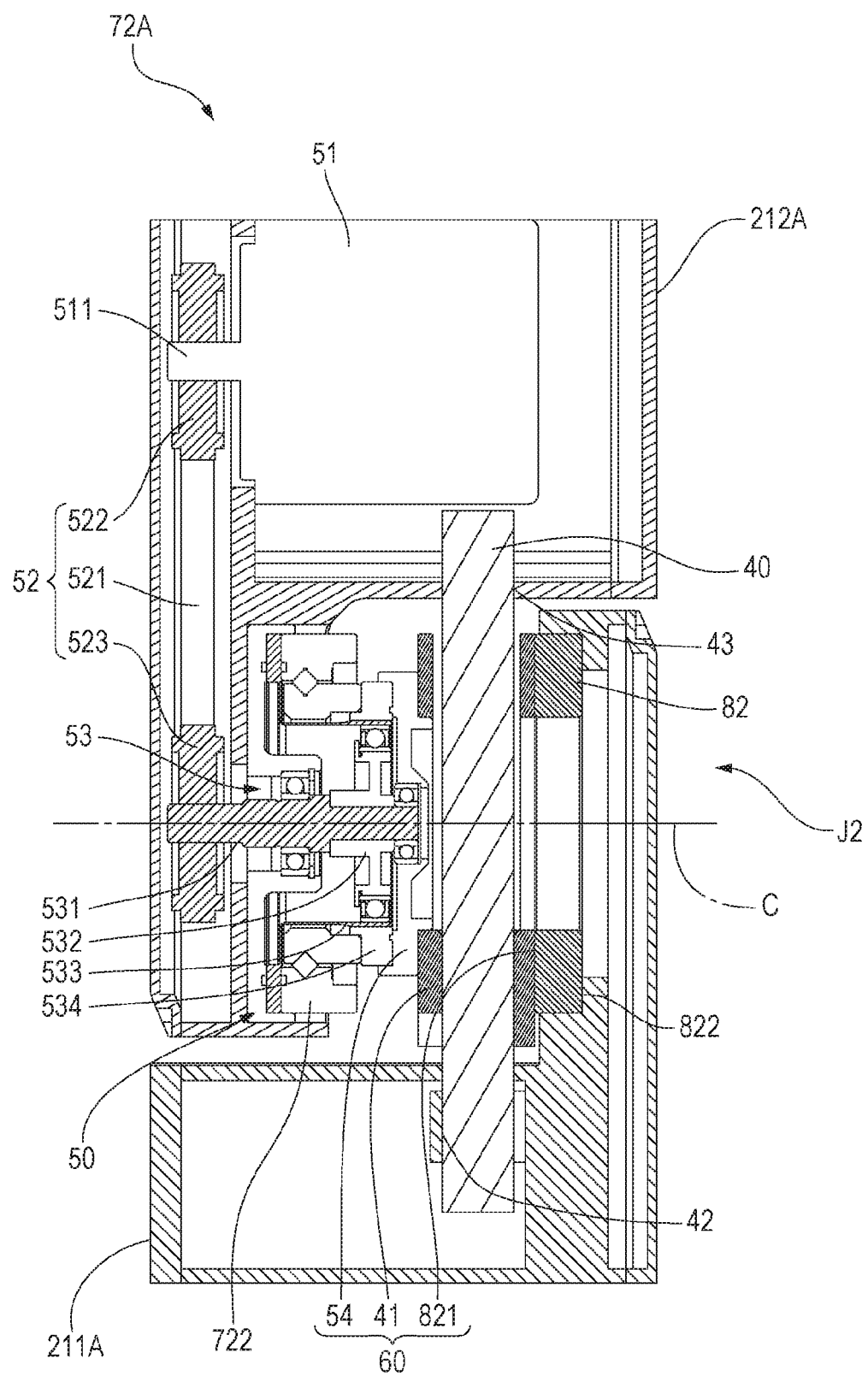
FIG. 7 is a sectional view of a driving mechanism according to a second embodiment.

A driving mechanism according to a second embodiment of the present invention will be described. FIG. 7 is a sectional view of the driving mechanism according to the second embodiment. In FIG. 7, components like to those in the first embodiment are designated by like reference numbers, and a description thereof is omitted.

A driving mechanism 72A according to the second embodiment differs from the driving mechanism 72 according to the first embodiment in that the base-side link and the periphery-side link are reversed. That is, according to the first embodiment, the first link is the link 211 corresponding to the base-side link, and the second link is the link 212 corresponding to the periphery-side link. According to the second embodiment, the first link is a link 212A corresponding to the periphery-side link, and the second link is a link 211A corresponding to the base-side link. More specifically, when the first link is regarded as a criterion, the second link swings with respect to the first link, and when the second link is regarded as a criterion, the first link swings with respect to the second link. Accordingly, the link 211A corresponding to the second link relatively swings with respect to the link 212A when the link 212A corresponding to the first link is regarded as a criterion.

The electric motor 51 and the speed reducer 53 that form the driving portion 50 are supported by the link 212A on the periphery side, which corresponds to the first link. The torque sensor 82 is connected to the link 211A on the base side, which corresponds to the second link. The support member 41 is disposed between the torque sensor 82 and the driving portion 50. The other components are the same as in the first embodiment.

The driving mechanism 72A according to the second embodiment enables the motor and the encoder for driving the joint J2 to be accommodated in the link 212A, which is to be driven, and is effective to decrease the size of the robot, particularly, in the case where the height of the robot in the vertical direction is decreased.

According to the second embodiment, the torque that is detected by the torque sensor 82 is not the torque that causes the link 212A to be driven but the reaction torque thereof. This is not affected by the reaction force applied by the wiring member 40 as in the first embodiment. Accordingly, the torque due to the external force that acts on the link 212A can be accurately detected.

The following will be described with a force related to the joint J2 and the balance of moment. As in the expressions (1) to (4), $T_{drv}$ is torque that the driving portion 50 applies. $T_{link}$ is moment (torque) about the central axis C of the joint J2 due to the external force that acts on the link 212A. $T_{dis}$ is moment due to the force that the wiring member 40 applies to the link 212A. $T_{JTS}$ is torque that is detected by the torque sensor 82.

Torque that acts on the link 212A includes three kinds of torque: the torque (=the torque that causes the link 212A to be driven) $T_{link}$ due to the external force, the torque $T_{drv}$ that the driving portion 50 applies, and the resistance torque $T_{dis}$ of the wiring member 40. Accordingly, the equilibrium of torque at the link 211A can be expressed as the expression (7).

$$T_{link} = T_{dis} + T_{drv} \quad (7)$$

The torque sensor 82 is fixed to the driving portion 50 with the support member 41 interposed therebetween. A part of the wiring member 40 that extends between the support member 41 and the link 211A does not deform even when the joint J2 moves. Accordingly, it can be thought that the torque that acts on the torque sensor 82 is the torque that is applied by the support member 41. Since the torque sensor 82 is fixed to the link 211A, the reaction force of the torque $T_{JTS}$ that is detected by the torque sensor 82 acts on the support member 41.

Accordingly, the torque that acts on the support member 41 includes three kinds of torque: the reaction torque $-T_{drv}$ of the torque that the driving portion 50 applies, the reaction torque $-T_{dis}$ of the wiring member 40, and the torque $-T_{JTS}$ at which the torque sensor 82 supports the support member 41. Accordingly, the equilibrium of torque that is expressed as the expression (8) holds.

$$-T_{drv} - T_{dis} = -T_{JTS} \quad (8)$$

As clear from the above, removal of $T_{drv}$ and $T_{dis}$ from the expressions (7) and (8) gives the expression (9).

$$T_{JTS} = T_{link} \quad (9)$$

Accordingly, the driving mechanism 72A according to the second embodiment enables the external force torque (the reaction torque of the torque for driving the link 212A) that acts on the link 212A to be detected with high sensitivity and high precision without being affected by disturbance torque due to the deformation of the wiring member 40.

Third Embodiment

Figure 8:
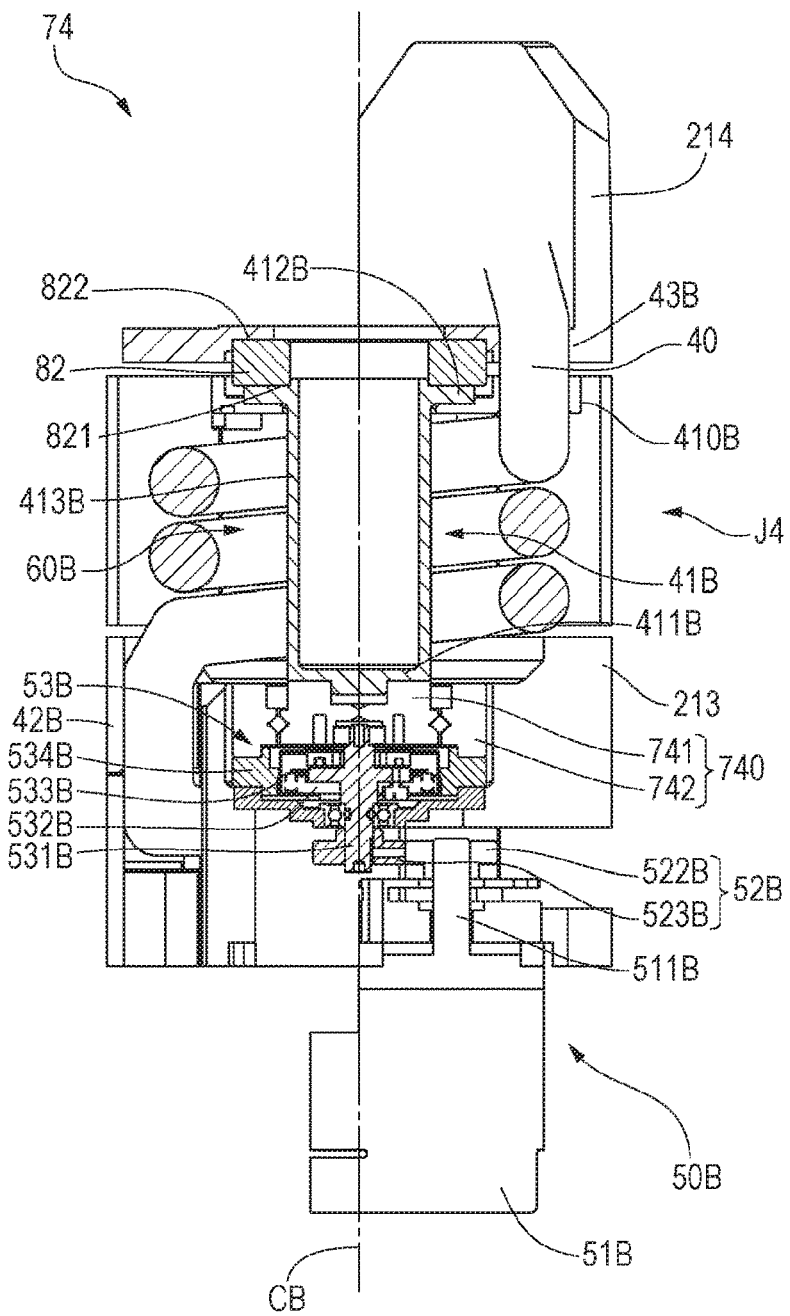
FIG. 8 is a sectional view of a driving mechanism according to a third embodiment.

A driving mechanism according to a third embodiment of the present invention will now be described. FIG. 8 is a sectional view of the driving mechanism according to the third embodiment. FIG. 8 illustrates the driving mechanism 74 of the joint J4 of the robot arm 201 illustrated in FIG. 1. Each driving mechanism described according to the first and second embodiments is for use in a swing joint. The driving mechanism described according to the third embodiment is for use in a rotation joint.

The driving mechanism 74 includes the link 213 corresponding to the first link on the proximal end portion side of the robot arm 201, and the link 214 that corresponds to the second link on the distal end portion side of the robot arm 201 and that relatively rotates with respect to the link 213.

According to the third embodiment, the link 213 is the stationary link (referred to also as the base-side link), and the link 214 is the output link (referred to also as the movable link or the periphery-side link) that is movable with respect to the stationary link. The driving mechanism 74 includes a driving portion 50B, the wiring member 40, a support member 41B that supports the wiring member 40, and the torque sensor 82.

The driving portion 50B is supported by the link 213 and applies a driving force that causes the link 214 to rotate about the central axis (rotational axis) CB with respect to the link 213. That is, the driving portion 50B applies torque between the link 213 and the link 214.

The wiring member 40 extends across the link 213 and the link 214. The torque sensor 82 detects torque in accordance with displacements of the inner wheel member 821 corresponding to the member near the driving portion (primary connection member) and the outer wheel member 822 corresponding to the link-side member (secondary connection member) and detects torque that acts on the link 214 according to the third embodiment. The torque sensor 82 has the same structure as that in FIG. 4A and FIG. 4B described according to the first embodiment and includes the elastic deformation members 823 and the detection portion 824 that are not illustrated in FIG. 8.

The driving portion 50B includes an electric motor 51B corresponding to the rotary drive source and a speed reducer 53B that reduces the rotational speed of the electric motor 51B and applies a rotational force. According to the third embodiment, the driving portion 50B includes a transmission mechanism 52B that transmits the rotational force of the electric motor 51B to an input shaft of the speed reducer 53B.

A part of the wiring member 40 in the longitudinal direction is fixed to the link 213 by a fixing member 42B and another part that differs from the part fixed by the fixing member 42B in the longitudinal direction is fixed to the link 214 by a fixing member 43B. The wiring member 40 extends inside the links 213 and 214. According to the third embodiment, the part of the wiring member 40 that is fixed by the fixing member 42B and the part that is fixed by the fixing member 43B are supported by the support member 41B.

The speed reducer 53B is a strain wave gearing speed reducer. The speed reducer 53B includes an input shaft 531B, a wave generator 532B that is fixed to the input shaft 531B, a flexspline 533B, and a circular spline 534B. The circular spline 534B is fixed to the link 213. An outer wheel 742 of a bearing 740 such as a cross roller bearing is fixed to the circular spline 534B. The flexspline 533B is fixed to an inner wheel (rotation member) 741 of the bearing 740. A driving force of the speed reducer 53B is applied to the inner wheel (rotation member) 741. Thus, the inner wheel 741 rotates about the central axis CB.

The transmission mechanism 52B includes a gear 522B that is fixed to a rotation shaft 511B of the electric motor 51B and a gear 523B that is fixed to the input shaft 531B of the speed reducer 53B and that is engaged with the gear 522B.

A driving force applied by the electric motor 51B is transmitted through the transmission mechanism 52B and causes the input shaft 531B of the speed reducer 53B to rotate. The speed reducer 53B increases torque applied by the electric motor 51B by an amount corresponding to the reduction ratio (decreases a rotational angle by an amount corresponding to the reduction ratio at the same time), and the increased torque is applied from the inner wheel 741 of the bearing 740. Thus, the torque applied by the electric motor 51B is increased by the speed reducer 53B to a level suitable for driving the joint J4. The torque applied by the speed reducer 53B causes the link 214 to actively rotate.

According to the third embodiment, the driving portion 50B is connected on the output side (the inner wheel 741 of the bearing 740) to the torque sensor 82 with the support member 41B interposed therebetween. That is, the support member 41B is connected (fixed) to the inner wheel 741 of the bearing 740 that rotates in response to the driving force of the driving portion 50B.

The inner wheel member 821 is connected (fixed) to the support member 41B. The outer wheel member 822 is fixed to the link 213. Accordingly, the inner wheel member 821 rotates together with the support member 41B (the inner wheel 741 of the bearing 740), and the outer wheel member 822 rotates together with the link 214.

That is, the inner wheel 741 of the bearing 740, the support member 41B, and the inner wheel member 821 form an output member 60B that applies the driving force of the driving portion 50B. Accordingly, an end of each elastic deformation member 823 is directly supported by the output member 60B (indirectly supported by the driving portion 50B on the output side), and the other end of the elastic deformation member 823 is directly supported by the outer wheel member 822 (indirectly supported by the link 214). Since the output member 60B is divided into the three members 741, 41B, and 821B, the driving mechanism 74 is easy to manufacture.

The wiring member 40 is supported by the output member 60B, specifically, the support member 41B between the torque sensor 82 and the driving portion 50B. Accordingly, the reaction force applied by the wiring member 40 that deforms when the joint J4 rotates is applied to the driving portion 50B (the speed reducer 53B) on the output side, does not directly act on the link 214, and is unlikely to be applied to the link 214.

Thus, the physical quantity corresponding to the torque that is detected by the torque sensor 82 (the detection portion 824) is inhibited from being affected by the reaction force of the wiring member 40. Accordingly, the torque (physical quantity corresponding thereto) due to the external force that acts on the link 214 can be detected with high sensitivity and high precision. Consequently, the accuracy of the compliance control of the robot arm 201 is improved.

The driving mechanism 74 is a mechanism that drives the joint J4 corresponding to a wrist joint of the robot arm 201. The link 213 on the periphery side is elongated in the direction of the central axis (rotational axis) CB of the joint J4. That is, the joint J4 is the rotation joint.

According to the first and second embodiments, the links 212 and 212A of the driving mechanism 72 on the periphery side are arranged in the direction perpendicular to the central axis C of the joint J2. That is, the joint J2 is the swing joint. For the swing joint, the wiring member 40 can be perpendicular to the central axis C (the longitudinal direction of the links). However, this is difficult for the rotation joint. A joint for controlling the posture of the wrist of an articulated robot arm is typically required to have a movement angle larger than that of a joint at the base. For example, for the joint at the base, a movement angle of about ±120° suffices to control the position of the fingers. However, it is necessary for the joint at the wrist to have a movement angle of about ±180° or more in some cases. Accordingly, there is a need for a structure that enables the wiring member to be pulled and that does not impede the rotation of the joint.

Figure 9:
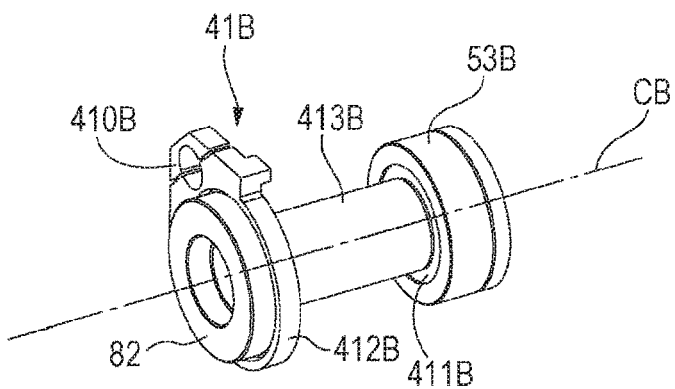
FIG. 9 is a perspective view of a support member of the driving mechanism according to the third embodiment.

To satisfy the need, the support member 41B of the driving mechanism 74 according to the third embodiment illustrated in FIG. 8 has a structure that differs from the structure of the support member 41 of the driving mechanism 72. FIG. 9 is a perspective view of the support member of the driving mechanism according to the third embodiment. The support member 41B includes a fixing portion 410B that fixes the wiring member 40, a mounting portion 411B corresponding to the first mounting portion that is mounted on the inner wheel 741 of the bearing 740, and a mounting portion 412B corresponding to the second mounting portion that is mounted on the inner wheel member 821. The support member 41B also includes a winding portion 413B that is disposed between the mounting portion 411B and the mounting portion 412B so as to be coaxial (CB) with the inner wheel 741 of the bearing 740, and the wiring member 40 is wound around the winding portion 413B. The fixing portion 410B is disposed on the mounting portion 412B.

The winding portion 413B is a guide for the wiring member 40 and has a shaft shape (a cylindrical shape or a columnar shape) extending in the direction of the central axis CB corresponding to a joint rotation axis.

A part of the wiring member 40 near the link 213 between the part thereof that is fixed to the link 213 by the fixing member 42B and the part thereof that is fixed to the link 214 by the fixing member 43B is spirally wound around the outer circumferential surface of the winding portion 413B. A part of the wiring member 40 near the link 214 between the part thereof that is fixed to the link 213 by the fixing member 42B and the part thereof that is fixed to the link 214 by the fixing member 43B is fixed by the fixing portion 410B. The fixing portion 410B has a slot shape and pinches the wiring member 40 with, for example, bolts, not illustrated, to clump and support the wiring member 40.

As illustrated in FIG. 8, the torque sensor 82 is connected to the support member 41B by using the inner wheel member 821 and is connected to the link 214 by using the outer wheel member 822. The support member 41B supports the reaction force of the wiring member 40.

Thus, the torque can be accurately detected without being affected by the reaction force due to the deformation of the wiring member 40. In addition, a space in which the wiring member 40 that is spirally wound moves can be ensured, and the movement angle of the joint J4 can be ensured without applying excessive stress to the wiring member 40 in a manner in which the diameter of the winding portion 413B and the length thereof in the direction of the central axis CB are appropriately determined.

The driving mechanism 74 of the joint J4 is described above. The other driving mechanisms 71 and 76 of the joints J1 and J6 that rotate can have the same structure as the driving mechanism 74. Accordingly, the accuracy of the force control (compliance control) of the robot arm 201 is further improved.

The present invention is not limited to the above embodiments. Various modifications can be made within the range of the technical idea of the present invention. The most preferable effects of the present invention are merely described as the effects according to the embodiments of the present invention. The effects of the present invention are not limited to the effects described according to the embodiments of the present invention.

In an example described according to the above embodiments, the robot arm 201 has six axes. However, the number of the axes may be appropriately changed in accordance with the use or the purpose.

In an example described according to the above embodiments, the robot arm 201 is a vertical articulated robot arm, but is not limited thereto. For example, various robot arms such as a horizontal articulated joint robot arm and a parallel link robot arm can be used as the robot arm 201.

In an example described according to the above embodiments, the bearings 720 and 740 (joint support mechanisms) are cross roller bearings that achieve a desired supporting function with a single mechanism, but are not limited thereto. For example, angular bearings may be used, or other bearing mechanisms may be combined.

According to the above embodiments, the driving portions 50 and 50B use the combination of the electric motor and the speed reducer, but are not limited thereto. For example, directly driven motors that use no speed reducer may be used as the driving portions. The power supply is not limited to electricity. A mechanism that is driven by a fluid such as a hydraulic or pneumatic mechanism may be used in accordance with the required output level or the characteristics of the driving portions.

According to the embodiments described above, each torque sensor 82 achieves the function independent as a single sensor. The structure of the sensor, however, is not limited thereto. The torque sensor may be formed integrally with another component included in the corresponding joint. For example, the support member and the primary connection member (the member near the driving portion) of each torque sensor may be formed integrally with each other, or the secondary connection member (link-side member) of each torque sensor and the second link may be formed integrally with each other. Similarly, the support member may be formed integrally with the output mechanism (rotation member) of the driving portion.

According to the above embodiments, the inner wheel member of each torque sensor corresponds to the primary connection member, and the outer wheel member corresponds to the secondary connection member. The same function is achieved when this relationship is reversed, and this may be appropriately changed if necessary.

In an example described above, the detection portion of each torque sensor is a strain gauge, but is not limited thereto. That is, the detection portion is not limited provided that the detection portion can detect the degree of the deformation (strain) of the elastic deformation member or the displacements of the primary connection member and the secondary connection member due to the deformation of the elastic deformation member. For example, an encoder may be used for detection.

The shape of the support member is not limited to the shape described according to the above embodiments. Various systems may be possible in accordance with the form of the joints. A driving mechanism that enables accurate measurement and control of torque without being affected by the reaction force applied by the wiring member can be achieved in a manner in which the driving portion and the support member can be appropriately arranged.

The present invention is not limited to the above embodiments. Various modifications and alternations can be made without departing from the spirit and scope of the present invention. Accordingly, the following claims are attached to publish the scope of the present invention.

According to the present invention, the reaction force due to the deformation of the wiring member acts on the output member. Accordingly, physical quantity corresponding to torque that is detected by the detection portion can be inhibited from being affected by the reaction force of the wiring member. Accordingly, torque due to an external force that acts on each link can be detected with high sensitivity and high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A driving mechanism comprising:
a link that pivots or rotates;
a transmission portion that transmits a driving force for driving the link;
a sensor that detects a force applied to the link; and
a wiring member supported between the sensor and the transmission portion.

2. The driving mechanism according to claim 1,
wherein the transmission portion includes
a speed changer that changes a speed of rotation of a drive source,
an output member that outputs rotation of the speed changer, and
a support member that is connected to the output member and the sensor and that supports the wiring member.

3. The driving mechanism according to claim 2,
wherein the support member includes
a first mounting portion that is mounted on the output member,
a second mounting portion that is mounted on the sensor, and
a fixing portion that fixes the wiring member.

4. The driving mechanism according to claim 2,
wherein the support member includes
a first mounting portion that is mounted on the output member,
a second mounting portion that is mounted on the sensor,
a fixing portion that fixes the wiring member, and
a winding portion around which the wiring member is wound.

5. The driving mechanism according to claim 2,
wherein the speed changer is a wave gearing speed reducer.

6. The driving mechanism according to claim 1,
wherein the wiring member is disposed inside the link.

7. A robot apparatus comprising:
a link that pivots or rotates;
a transmission portion that transmits a driving force for driving the link;
a sensor that detects a force applied to the link; and
a wiring member supported between the sensor and the transmission portion.

8. The driving mechanism according to claim 3,
wherein the sensor includes
a first member connected to the support member, and
a second member connected to the link,
wherein the first member is connected to the second mounting portion.

9. The driving mechanism according to claim 8,
wherein the sensor includes
an elastic portion that couples the first member and the second member, and
a detection unit that detects relative displacements of the first member and the second member.

10. The driving mechanism according to claim 1,
wherein the link, the sensor, the wiring member, and the transmission portion are disposed in this order in a direction of a rotation axis of the link.

11. The driving mechanism according to claim 1,
wherein the sensor detects, as the force applied to the link, including the driving force and a reaction force applied by the wiring member.

12. The robot apparatus according to claim 7,
wherein the transmission portion includes
a speed changer that changes a speed of rotation of a drive source,
an output member that outputs rotation of the speed changer, and
a support member that is connected to the output member and the sensor and that supports the wiring member.

13. The robot apparatus according to claim 12,
wherein the support member includes
a first mounting portion that is mounted on the output member,
a second mounting portion that is mounted on the sensor, and
a fixing portion that fixes the wiring member.

14. The robot apparatus according to claim 13,
wherein the sensor includes
a first member connected to the support member, and
a second member connected to the link,
wherein the first member is connected to the second mounting portion.

15. A method of manufacturing a product by using the robot apparatus according to claim 7.

16. A method for controlling a driving mechanism,
wherein the driving mechanism includes
a link that pivots or rotates,
a transmission portion that transmits a driving force for driving the link,
a sensor that detects a force applied to the link,
a wiring member supported between the sensor and the transmission portion, and
a controller that controls operation of the link,
the method comprising:
detecting, by the sensor, the force applied to the link; and
controlling, by the controller, the operation of the link, based on a result of detection by the sensor.

17. A method for controlling a robot apparatus,
wherein the robot apparatus includes
a link that pivots or rotates,
a transmission portion that transmits a driving force for driving the link, a sensor that detects a force applied to the link,
a wiring member supported between the sensor and the transmission portion, and
a controller that controls operation of the link,
the method comprising:
detecting, by the sensor, the force applied to the link; and
controlling, by the controller, the operation of the link, based on a result of detection by the sensor.

18. A non-transitory computer-readable storage medium storing a control program capable of executing the control method according to claim 10.

* * * * *